(12) United States Patent
Escande et al.

(10) Patent No.: US 9,162,653 B2
(45) Date of Patent: Oct. 20, 2015

(54) DEVICE FOR REPLACING A POWER BATTERY OF A DRIVE MOTOR OR A MOTOR VEHICLE

(75) Inventors: Bruno Escande, Septeuil (FR); Charles Lombarte, Villiers Saint Frederic (FR)

(73) Assignee: RENAULT s.a.s., Boulogne Billancourt (FR)

( * ) Notice: Subject to any disclaimer, the term of this patent is extended or adjusted under 35 U.S.C. 154(b) by 440 days.

(21) Appl. No.: 13/578,398

(22) PCT Filed: Feb. 9, 2011

(86) PCT No.: PCT/FR2011/050273
§ 371 (c)(1),
(2), (4) Date: Sep. 27, 2012

(87) PCT Pub. No.: WO2011/098725
PCT Pub. Date: Aug. 18, 2011

(65) Prior Publication Data
US 2013/0031776 A1 Feb. 7, 2013

(30) Foreign Application Priority Data

Feb. 10, 2010 (FR) ...................... 10 50912

(51) Int. Cl.
*B23P 21/00* (2006.01)
*B23Q 15/00* (2006.01)
*B60S 5/06* (2006.01)
(Continued)

(52) U.S. Cl.
CPC ... *B60S 5/06* (2013.01); *B60K 1/04* (2013.01); *B60L 11/1822* (2013.01); *B60L 11/1879* (2013.01); *H01M 2/1083* (2013.01); *B60K 2001/0455* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *Y10T 29/5313* (2015.01); *Y10T 29/53274* (2015.01)

(58) Field of Classification Search
USPC ........... 29/721, 724, 729, 730, 757, 760, 762; 141/104, 231; 320/109, 13; 414/266–267, 273, 277, 414/331.01–331.06
See application file for complete search history.

(56) References Cited

U.S. PATENT DOCUMENTS 3,826,115 A * 7/1974 Davis .............................. 70/258
4,249,403 A * 2/1981 Littlejohn ....................... 70/230
(Continued)

FOREIGN PATENT DOCUMENTS

DE          4 229 687        3/1994
DE       10 2007 032210     10/2008
(Continued)

OTHER PUBLICATIONS

International Search Report issued on Apr. 19, 2011 in PCT/FR11/050273 filed on Feb. 9, 2011.

*Primary Examiner* — Paul D Kim
(74) *Attorney, Agent, or Firm* — Oblon, McClelland, Maier & Neustadt, L.L.P.

(57) ABSTRACT

A toolbox device for actuating locking and/or unlocking of a power battery of a drive motor of a motor vehicle, the device including a supporting structure supporting a plurality of separate modules, each including at least one system for gripping a mechanism for locking/unlocking the battery and at least one actuator, a number of actuators being relative to a number of movements to be performed to implement the locking/unlocking the battery.

16 Claims, 4 Drawing Sheets

(51) Int. Cl.
     *B60K 1/04*   (2006.01)
     *B60L 11/18*  (2006.01)
     *H01M 2/10*   (2006.01)

(56) References Cited

U.S. PATENT DOCUMENTS

| | | | |
|---|---|---|---|
| 5,052,198 A * | 10/1991 | Watts | 70/58 |
| 6,014,597 A * | 1/2000 | Kochanneck | 701/22 |
| 8,164,300 B2 * | 4/2012 | Agassi et al. | 320/104 |
| 2007/0113921 A1 | 5/2007 | Capizzo | |
| 2009/0314382 A1 | 12/2009 | Capizzo | |
| 2010/0141206 A1 * | 6/2010 | Agassi et al. | 320/109 |
| 2010/0145717 A1 | 6/2010 | Hoeltzel | |
| 2011/0044791 A1 * | 2/2011 | Agassi et al. | 414/806 |
| 2012/0068664 A1 * | 3/2012 | Franzen et al. | 320/109 |
| 2012/0230762 A1 * | 9/2012 | Ruff | 403/349 |
| 2012/0240730 A1 * | 9/2012 | Escande et al. | 81/54 |
| 2012/0251281 A1 * | 10/2012 | Mulato | 414/589 |

FOREIGN PATENT DOCUMENTS

| | | |
|---|---|---|
| EP | 0 575 864 | 12/1993 |
| FR | 2 936 760 | 4/2010 |
| FR | 2 946 305 | 12/2010 |
| WO | 2010 004192 | 1/2010 |

* cited by examiner

DEVICE FOR REPLACING A POWER BATTERY OF A DRIVE MOTOR OR A MOTOR VEHICLE

BACKGROUND

The present invention relates to an actuation device for the locking and/or unlocking of a battery-type energy container of an electric motor vehicle. Hereinafter, the term battery will be used for reasons of simplicity. The invention also relates to a system for replacing a battery or any energy container of a motor vehicle including such an actuation device, as well as to a battery replacement station using such a system.

Some motor vehicles, such as electric or hybrid vehicles, comprise a battery for powering an electric drive motor. It may prove advantageous to exchange this battery when its energy level is low compared to a new charged battery. This can be done in a station similar to a service station in which a petrol tank of a motor vehicle can be filled.

The document U.S. Pat. No. 5,612,606 discloses a station for exchanging electric power supply batteries of a drive motor of an electric vehicle and a method for performing such an exchange. In the exchanging station described, the driver approximately positions the vehicle in a rail, against an end stop that is longitudinal in relation to the station equipment. Then, in more or less automatic phases, mobile means for removing the electric battery and assembling the new battery in the vehicle are positioned in relation to the vehicle by virtue of sensors.

One difficulty in putting such a battery exchange concept in place lies in the fact that there are a multitude of motor vehicles that may comprise batteries of different types, fixed differently to the motor vehicle. Now, it is not economically feasible to envisage multiplying the automatic devices for removing and replacing these different types of batteries, or to put a manual solution in place because of its cost and the weight of the batteries.

Thus, to allow for an easy deployment of the battery exchange stations (requiring little technological competence), it is necessary to make the operation of such stations reliable, robust, flexible and universal.

BRIEF SUMMARY

The aim of the invention is therefore to provide a solution for replacing a motor vehicle battery that achieves the above-mentioned objectives.

The concept of the invention is based on a universal and standard device comprising tools participating in the actuation of the mechanisms for locking and/or unlocking a battery mounted on a motor vehicle, that will hereinafter be referred to as "toolbox" in order to simplify the description.

More specifically, the invention is based on a toolbox device for the actuation of the locking and/or unlocking of a power supply battery of a drive motor of a motor vehicle, characterized in that it comprises a support structure supporting a number of distinct modules, each comprising at least one system for gripping a mechanism for locking/unlocking the battery and at least one actuation means, the number of actuation means being linked to the number of movements to be performed in order to implement the locking/unlocking of the battery.

The toolbox device may comprise four modules each comprising a gripping system.

The toolbox device may comprise at least one module comprising a link interface allowing it at least one degree of freedom relative to the support structure.

The toolbox device may comprise a module comprising a first actuation means suitable for performing a disengaging of a gripping system.

The module may comprise a cam system positioned at the end of the first actuation means to allow for the transfer and gearing down of the forces needed.

The module may comprise a second actuation means intended for the locking and unlocking of the end of the gripping system on a corresponding means of a lock of the battery of a motor vehicle.

The end of the gripping system of the module may comprise two openings suitable for a link with a mushroom-shaped corresponding means of the lock of the battery of a motor vehicle.

The toolbox device may comprise a module comprising a third actuation means allowing for the actuation of the locking/unlocking of the battery of a motor vehicle.

This actuation of the locking/unlocking of the battery of a motor vehicle may be obtained by a translational movement and a rotational movement of the gripping system.

The toolbox device may comprise a module comprising a "roller" system for limiting the forces on the support structure and avoiding its deterioration.

The invention also relates to a system for replacing a battery of a motor vehicle, characterized in that it comprises a toolbox device as described previously and a lifting device for lifting this toolbox device, allowing for its vertical displacement.

The invention also relates to a station for replacing a power supply battery of a drive motor of a motor vehicle, characterized in that it comprises a toolbox device as described previously for the replacement of a battery of a motor vehicle.

BRIEF DESCRIPTION OF THE DRAWINGS

These objects, characteristics and advantages of the present invention will be explained in detail in the following description of a particular embodiment, given as a nonlimiting example in relation to the appended figures, in which.

DETAILED DESCRIPTION

Figure 1:
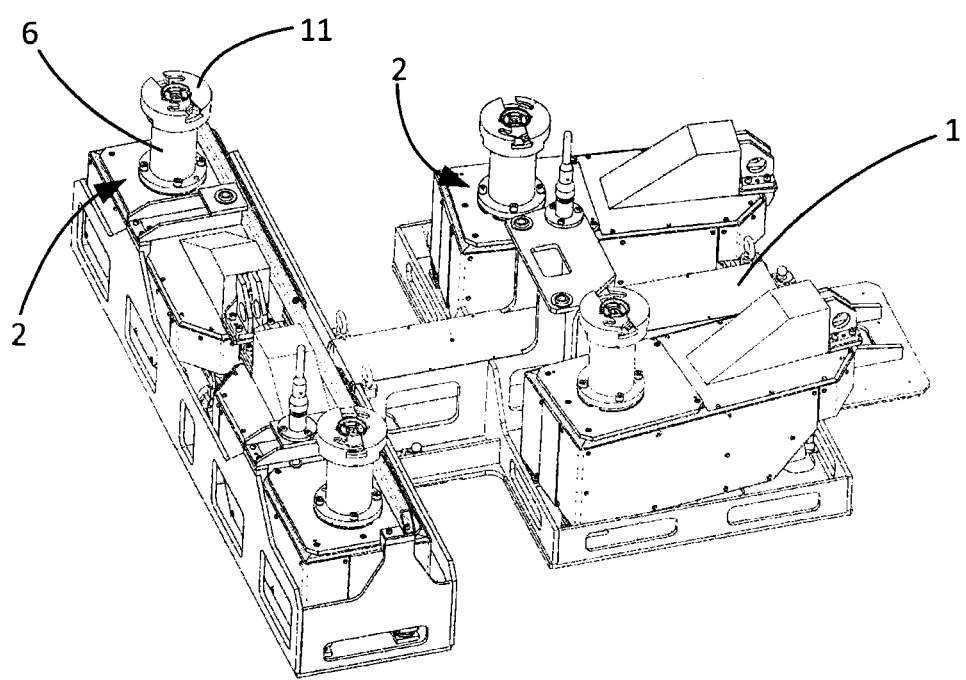
FIG. 1 represents a perspective view of a toolbox device according to one embodiment of the invention.

The concept of the invention is based on an actuation tools device, called "toolbox device", which comprises a certain number of standard and modular components in order to obtain a device suitable for an intervention on all types of batteries and all motor vehicles. This toolbox device of the invention represents a universal kinematic adaptor, allowing for adaptation to the widest diversity of batteries at least cost.

The figures represent a toolbox device according to one embodiment of the invention. This toolbox device comprises a frame or support structure 1 on which are mounted four modules 2, each intended to actuate a mechanism for locking/unlocking a battery of a motor vehicle. Each module 2 takes the form of a distinct element of the support structure 1, possibly fixed removably. The support structure 1 is T-shaped, particularly suited to the motor vehicle batteries positioned in the trunk of the vehicle. As a variant, the support structure 1 could take other forms.

Each module 2, more particularly represented by figures and 3, comprises one or more actuation means, including one or more simple and standard motors and a system 6 for gripping the locking mechanisms, the function of which is to actuate the mechanism for locking and unlocking a battery of a motor vehicle. The number of actuation means is more particularly linked to the number of movements needed to implement the locking and/or the unlocking of the battery.

The gripping system 6 has a cylindrical form, extending over the top surface of the module 2 in order to allow its top end 11 to link with the locks of a battery of a motor vehicle. Each module 2 comprises, in addition, an electrical connection for powering its motors as well as an interface 7 for a flexible link with the support structure 1, in order to enable the toolbox device to position the gripping system 6 correctly on a motor vehicle. For this, the interface 7 comprises movement limiting elements, for example including balls associated with elastic studs, which make it possible to generate degrees of freedom, such as a rotation, between the different modules 2 and the support structure 1, making it possible to adjust the position of the modules 2 relative to a battery to be locked/unlocked. This solution thus makes it possible to adapt to the geometrical dispersion of the different components of the motor vehicle and of the toolbox device.

Figure 3:
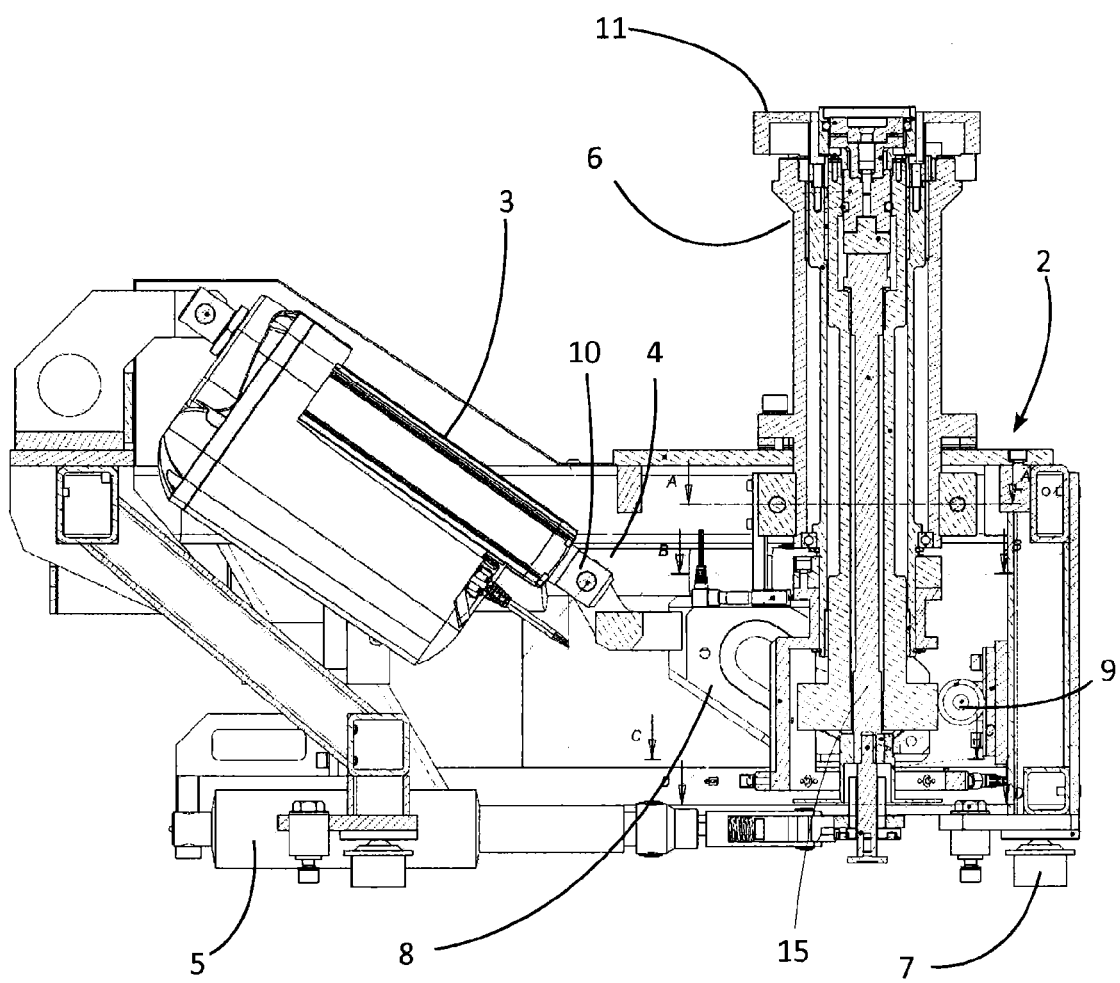
FIG. 3 represents a side view in cross section of a module of the toolbox device according to the embodiment of the invention.

On the embodiment represented, each module 2 comprises a number of complementary actuation means, which can be seen in particular in FIG. 3, suitable for allowing for the implementation of all the movements needed for the locking/unlocking. A first actuation means 3, comprising, for example, a motor and an electrical screw jack, is intended for performing a disengaging of the gripping system 6 so as to take up the forces between the battery and the bodywork of the motor vehicle. A second actuation means 4, comprising for example an electrical screw jack, is intended for locking of the end 11 of the gripping system 6 on a corresponding means of the lock of the battery on the motor vehicle. This second actuation means 4 may in particular allow for the locking of the toolbox device on mushroom-shaped elements, which will be described later with reference to FIG. 4. Finally, a third actuation means 5, for example of electrical screw jack type, allows for the specific actuation of the battery locking/unlocking movement, by, for example, a rotational movement of a quarter- or half-turn, as explained hereinbelow.

Each module 2 also comprises a cam system 8 positioned at the end of the first actuation means 3 allowing for the gearing down of the forces needed. Finally, each module 2 comprises a "roller" system 9, or any equivalent system, whose function is to retain the forces on the support structure 1 to avoid the deterioration of the toolbox device when the first actuation means 3 is set in motion and the cam system 8 is actuated in a substantially horizontal direction.

More specifically, when the screw jack of the first actuation means 3 receives a command to extend the stem 10 of its screw jack downward, said stem acts on the cam system 8 which allows for the transfer of the compression forces of Belleville washers to ultimately displace the compression axis 15 positioned within the gripping system 6. During this operation a reaction roller 9 absorbs the forces undergone during the displacement of this compression axis 15.

Figure 2A:
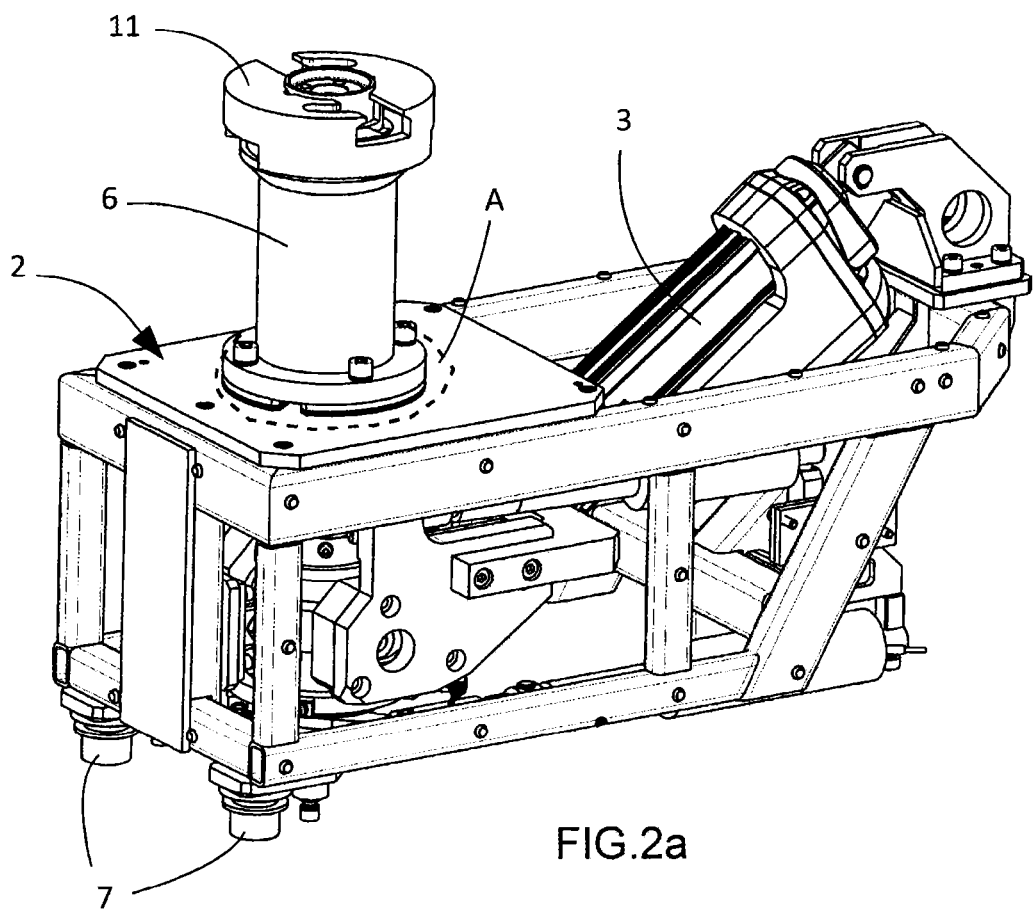
FIGS. 2a and 2b represent perspective views respectively from above and below of a module of the toolbox device according to the embodiment of the invention.
Figure 2B:
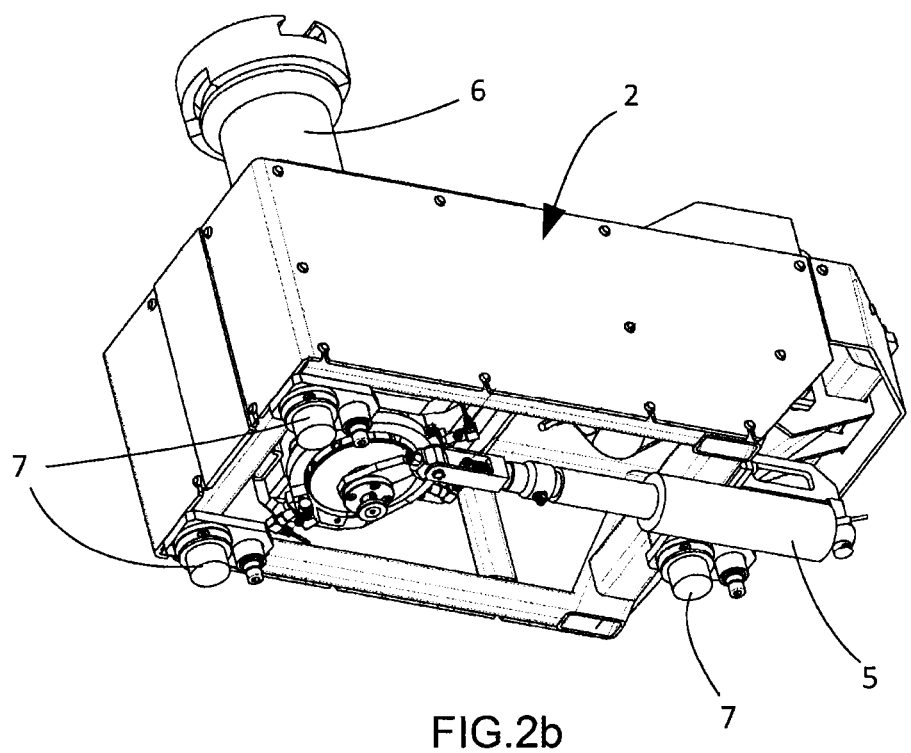

Optionally but advantageously, the module 2 also comprises an internal loop back means for the forces in order to relieve the forces transmitted to the support structure 1 and, more generally, to the entire battery exchange device. This internal loop back means for the forces is more specifically formed in the area A represented in FIG. 2*a*. The vertical component of the force is transmitted to the compression axis 15 and the reaction of this component is taken up by the gripping system 6 in the area A. The support structure 1 supports no force. Furthermore, the horizontal component of the force, originating from the stem 10 of the first actuation means 3, is transmitted to the compression axis 15 and the reaction of this component is taken up by the module 2 via the reaction roller 9. The structure 1, likewise, does not support this force.

Obviously, the invention is not limited to the embodiment described above. In particular, the support structure 1 may have other geometries and receive a different number of modules 2. Each module 2 may comprise a different number of gripping systems 6 and/or of actuation means, motors, but preferentially between three and six. Generally, the number of motors and of actuation means is directly linked to the number of movements to be performed to implement the locking and the unlocking of a battery. Furthermore, the independent actuators may be of electrical, hydraulic, kinematic with cam, or any such type. Finally, the precise structure of the toolbox device in terms of number of modules, of actuation means and of gripping systems will in fact depend on the locking mechanism of the battery on the motor vehicle. According to one advantageous element of the invention, one and the same module 2 may be mounted on different support structures 1, which makes it possible to use standard modules 2 for all types of batteries and motor vehicles. Similarly, since each module 2 comprises exactly the number of actuation means associated with the movements needed for the locking/unlocking, such a toolbox device therefore comprises standard interfaces which are perfectly suited to the corresponding battery and/or vehicle type.

According to an advantageous embodiment, each module 2 may be replaced independently of the rest of the structure of the toolbox device. This allows for the replacement of just the defective module if necessary, without touching the rest of the toolbox device. For this, the link interface of each module allows it a removable link.

The operation of the toolbox device according to the invention will now be explained. A system for lifting and possibly displacing the toolbox device is provided on a battery exchange station. It is possible to provide a lifting system with no displacement function and limited solely to a lifting function, that is to say to the substantially vertical displacement of the toolbox device. The displacement function will then be obtained by a separate displacement system that can either displace the battery to be mounted or the vehicle on which the battery is to be mounted. The toolbox device may, for example, be displaced by a device of roller type operating using conveying rails. As a variant, a robot may be used for the displacement of the toolbox device, the latter then comprising a link interface, for example, in the form of gripping handles.

The system for lifting and displacing the toolbox device allows it to be positioned under a motor vehicle, from where the battery can be accessed. It allows for the connection of the toolbox device with the lock of the battery of the motor vehicle, by a substantially vertical displacement of the toolbox device. For this, and first of all, at most three gripping systems 6 of the toolbox device are correctly positioned, since they are, by definition, coplanar, before allowing for the positioning of the fourth gripping system, or even of the other gripping system(s) if there are more than four thereof, which accesses/access a precise positioning by virtue of their mobility in relation to the support structure 1 because of their link which has at least one degree of freedom, described previously, which makes it possible to make up for any geometrical dispersions. These two toolbox device positioning phases may also be coupled.

Figure 4:
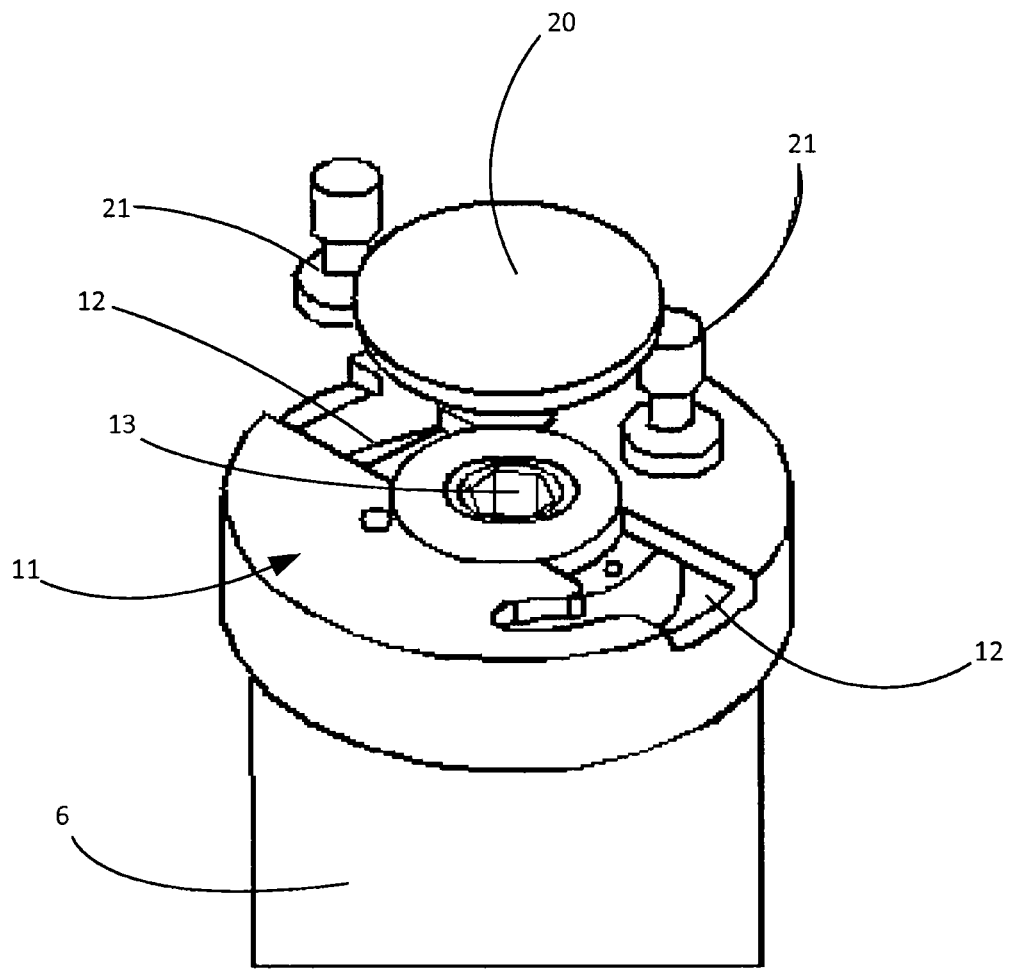
FIG. 4 represents, in perspective, the link between a toolbox device according to the embodiment of the invention and a motor vehicle battery lock.

FIG. 4 illustrates a phase in which the top part 11 of a gripping system 6 approaches a corresponding lock holding a battery on a motor vehicle, implemented by a lifting system as explained above. Only the bottom link portion 20 and the two mushroom-shaped lateral link elements 21 for fixing the lock are represented, in order to simplify the figure. The end 11 of the gripping system 6 comprises two openings 12 arranged symmetrically around a link element 13 which is in the form of a hexagonal aperture suitable for receiving a corresponding hexagonal stem, not represented, arranged under the surface of the link element 20 of the lock, or which may, as a variant, be any other link of flat/half-flat type. Each opening 12 has a substantially circular portion, of significant size corresponding to a mushroom 21 so as to be able to insert such a mushroom through this circular portion. Then, each opening 12 comprises a narrower portion, forming an arc-of-circle portion, within which the narrowest portion of a mushroom 21 can be displaced after its insertion into the circular aperture, so as to obtain its locking and therefore the locked fixing of the gripping system 6 on the lock of the battery. This locked fixing of a gripping system on a battery lock is implemented by its rotation by the second actuation means of the module concerned, as explained previously. As a variant, this fixing could be obtained by another geometry and/or other movements, such as a translation. This operation is performed, preferably at the same time, for all the modules of the toolbox device, in order to obtain the locked fixing of this toolbox device on the lock of the battery.

Then, the central portion 13 of the link between the gripping system and the lock is displaced by vertical translation, via the compression axis 15 described previously, to come to bear on a piston and disengage the lock, before locking it or unlocking it by a rotational movement. These two movements are implemented by the third actuation means explained previously.

Thus, the actuation of the gripping systems 6 of the toolbox device makes it possible to act on the locks of the battery, so as to lock them or unlock them. The toolbox device is thus able to lock and/or unlock a battery fixed on a motor vehicle. As a variant, it may fulfill a second function of holding and transporting the battery, in addition to its first function of actuation of the locking and unlocking mechanisms, in order in particular to dispose of a spent battery after it has been unlocked, using a lifting and displacement system. Conversely, the toolbox device also makes it possible to feed in a new charge battery, to fix this new charged battery as a replacement for the spent battery.

Thus, the solution described offers the following advantages:
  it is suitable for standardizing the operations of locking and unlocking a battery on a motor vehicle, because of its great flexibility through the use of simple and standard components suitable for a multitude of different movements, for effectively transferring the forces and with great geometrical precision;
  it is inexpensive;
  it is suited to an implementation in a battery exchange service station, because it represents a system with standard interface and optimized bulk;
  it is suited to the construction of a network of universal battery exchange service stations, which can be adapted to the type of vehicles accommodated.

The invention claimed is:

1. A toolbox device for actuating locking and/or unlocking of a power supply battery of a drive motor of a motor vehicle, comprising:
  a support structure; and
  a plurality of distinct modules supported by the support structure, each of the modules comprising:
    at least one gripping system for gripping a mechanism for locking and/or unlocking the battery, an end face of the at least one gripping system including a link element and openings; and
    at least one actuation means,
  wherein the at least one actuation means of each of the modules moves the at least one gripping systems in a first movement such that the openings receive a portion of the battery within the openings to fix the at least one gripping system to the battery, and
  wherein the at least one actuation means of each of the modules is linked to a second movement to move the link element to implement the locking and/or the unlocking of the battery.

2. The toolbox device as claimed in claim 1, wherein the plurality of modules includes four modules each comprising one gripping system of the at least one gripping system.

3. The toolbox device as claimed in claim 1, wherein at least one module of the plurality of modules includes a link interface allowing the at least one of the plurality of modules at least one degree of freedom relative to the support structure.

4. The toolbox device as claimed in claim 1, wherein at least one module of the plurality of modules includes a first actuation means of the at least one actuation means, the first actuation means being configured to perform a disengagement of the at least one gripping system.

5. The toolbox device as claimed in claim 4, wherein the at least one module of the plurality of modules comprises a cam system positioned at an end of the first actuation means to allow for transfer and gearing down of forces needed.

6. The toolbox device as claimed in claim 4, wherein the first actuation means includes a motor and a screw jack.

7. The toolbox device as claimed in claim 1, wherein at least one module of the plurality of modules includes a second actuation means of the at least one actuation means, the second actuation means being configured to lock and/or unlock the end face of the at least one gripping system on a corresponding lock of the battery of the motor vehicle.

8. The toolbox device as claimed in claim 7, wherein the openings on the end face of the at least one gripping system are configured to link with a mushroom-shaped link element of the lock of the battery of the motor vehicle.

9. The toolbox device as claimed in claim 7, wherein the second actuation means includes a screw jack.

10. The toolbox device as claimed in claim 1, wherein at least one module of the plurality of modules includes a third actuation means allowing for actuation of the locking and/or the unlocking of the battery of the motor vehicle.

11. The toolbox device as claimed in claim 10, wherein the actuation of the locking and/or the unlocking of the battery of the motor vehicle is obtained by a translational movement and a rotational movement of the at least one gripping system.

12. The toolbox device as claimed in claim 10, wherein the third actuation means includes a screw jack.

13. The toolbox device as claimed in claim 1, wherein at least one module of the plurality of modules includes a roller system for limiting forces on the support structure and avoiding a deterioration of the toolbox device.

14. The toolbox device as claimed in claim 1, wherein the at least one actuation means includes at least one screw jack.

15. A system for replacing a battery of a motor vehicle, comprising:
- the toolbox device as claimed in claim 1; and
- a lifting device for lifting the toolbox device, allowing for a vertical displacement of the toolbox device.

16. A station for replacing a power supply battery of a drive motor of a motor vehicle, comprising:
- the toolbox device as claimed in claim 1, for replacement of the battery of the motor vehicle.

* * * * *